US012640160B1

(12) United States Patent
Li et al.

(10) Patent No.: US 12,640,160 B1
(45) Date of Patent: May 26, 2026

(54) EMBEDDING-FREE SPEAKER DIARIZATION

(71) Applicant: Amazon Technologies, Inc., Seattle, WA (US)

(72) Inventors: Xiang Li, Santa Clara, CA (US); Sundararajan Srinivasan, Mountain View, CA (US); Rohit Paturi, Newark, CA (US); Vivek Govindan, Maple Valley, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 168 days.

(21) Appl. No.: 18/742,187

(22) Filed: Jun. 13, 2024

(51) Int. Cl.
G10L 21/028 (2013.01)
G10L 17/02 (2013.01)
G10L 17/18 (2013.01)

(52) U.S. Cl.
CPC ............ G10L 21/028 (2013.01); G10L 17/02 (2013.01); G10L 17/18 (2013.01)

(58) Field of Classification Search
None
See application file for complete search history.

(56) References Cited

U.S. PATENT DOCUMENTS

| | | | | |
|---|---|---|---|---|
| 11,392,639 | B2 * | 7/2022 | Boothalingam ...... | G06F 16/685 |
| 2022/0254352 | A1 * | 8/2022 | Fujita .................... | G06N 3/045 |
| 2022/0375492 | A1 * | 11/2022 | Grangier ................ | G10L 25/78 |
| 2023/0419979 | A1 * | 12/2023 | Kim ........................ | G10L 17/04 |
| 2024/0013774 | A1 * | 1/2024 | Zhang .................... | G10L 17/18 |
| 2024/0105182 | A1 * | 3/2024 | Ando ...................... | G10L 15/04 |
| 2024/0119927 | A1 * | 4/2024 | Koluguri ................ | G06N 3/045 |

* cited by examiner

*Primary Examiner* — Nafiz E Hoque
(74) *Attorney, Agent, or Firm* — K&L Gates LLP

(57) ABSTRACT

Devices and techniques are described for embedding-free speaker diarization. In some examples, a first speaker ID label is determined for a first frame and a second speaker ID label may be determined for a second frame of a first window of audio. A third speaker ID label may be determined for a third frame of a second window. First combined data representing at least the first frame and the third frame and second combined data representing at least the second frame and the third frame may be generated. First posterior data associated with the first frame and second posterior data associated with the third frame may be generated. Third posterior data associated with the second frame and fourth posterior data associated with the third frame may be generated. A determination may be made that the first speaker ID label and the third speaker ID label correspond to the same speaker.

20 Claims, 8 Drawing Sheets

Local Spk labels 202

111 22 11

33444 333

565556666

204

Overlap frames

208a $X_1$  208b $X_2$  208c $X_3$

Local windows a) Local EEND b) Global EEND c) Affinity Matrix for Clustering

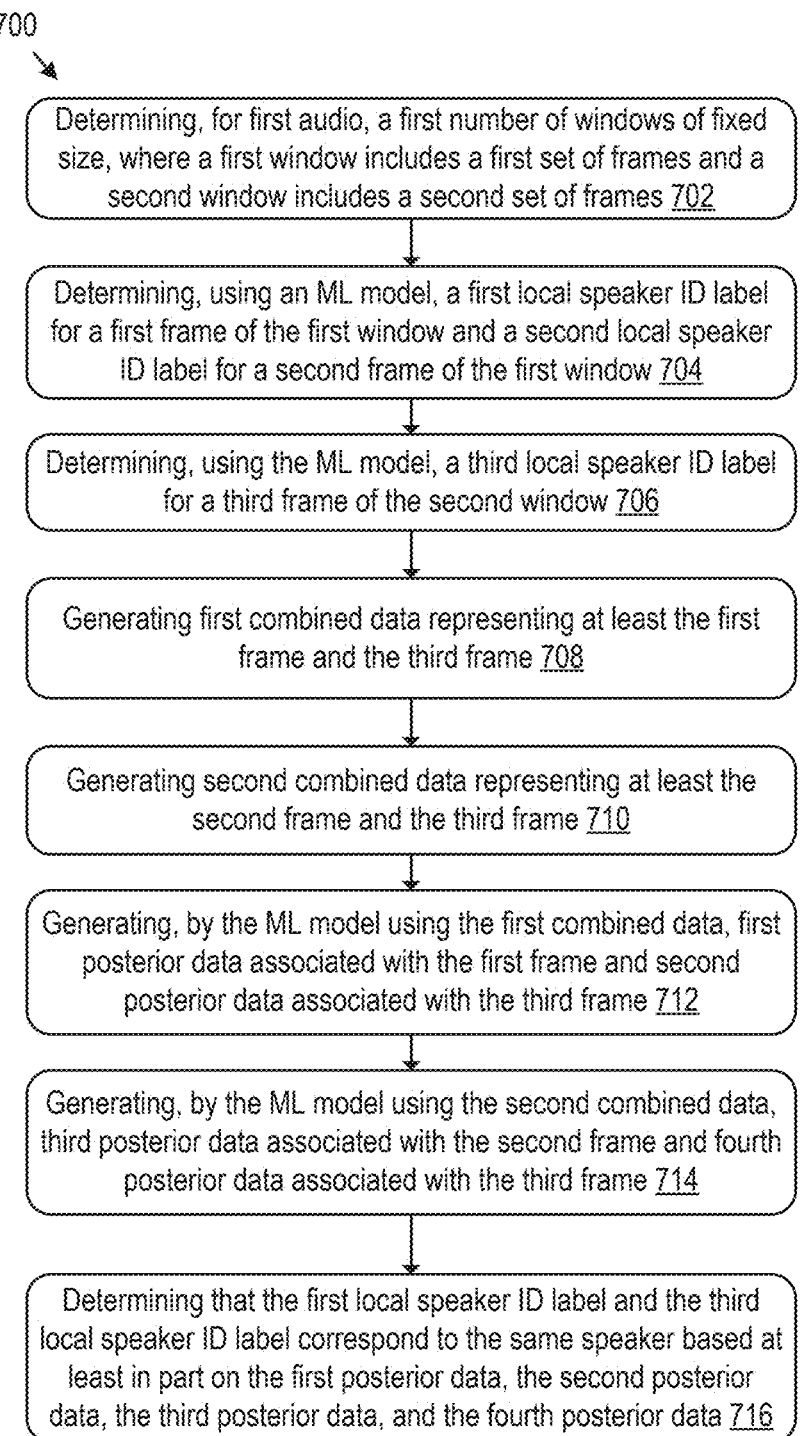

Determining, for first audio, a first number of windows of fixed size, where a first window includes a first set of frames and a second window includes a second set of frames 702

Determining, using an ML model, a first local speaker ID label for a first frame of the first window and a second local speaker ID label for a second frame of the first window 704

Determining, using the ML model, a third local speaker ID label for a third frame of the second window 706

Generating first combined data representing at least the first frame and the third frame 708

Generating second combined data representing at least the second frame and the third frame 710

Generating, by the ML model using the first combined data, first posterior data associated with the first frame and second posterior data associated with the third frame 712

Generating, by the ML model using the second combined data, third posterior data associated with the second frame and fourth posterior data associated with the third frame 714

Determining that the first local speaker ID label and the third local speaker ID label correspond to the same speaker based at least in part on the first posterior data, the second posterior data, the third posterior data, and the fourth posterior data 716

FIG. 7

EMBEDDING-FREE SPEAKER DIARIZATION

BACKGROUND

People can interact with computing devices using spoken commands. Automatic speech recognition (ASR) can be used to transcribe speech into text and/or other data representations of the speech. Natural language processing can be used to transform spoken requests into a computer directive for performing a task.

BRIEF DESCRIPTION OF DRAWINGS

FIG. 3 depicts an example of similarity clustering for embedding-free neural speaker diarization, in accordance with various aspects of the present disclosure.

FIG. 7 is a flowchart illustrating an example process for embedding-free neural speaker diarization, in accordance with various aspects of the present disclosure.

DETAILED DESCRIPTION

Figure 1:
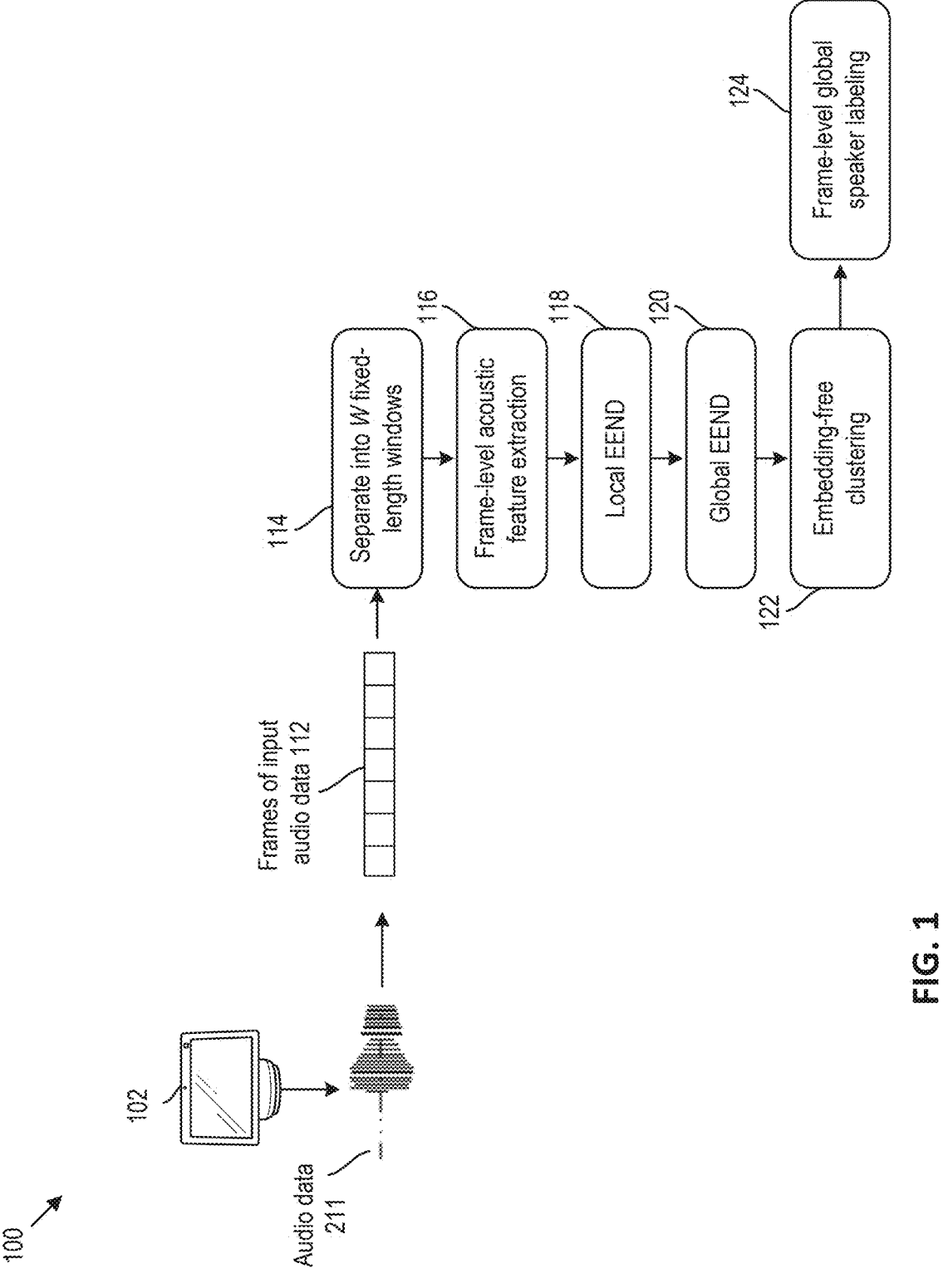
FIG. 1 is a block diagram illustrating an example embedding-free speaker diarization system, in accordance with various aspects of the present disclosure.

In the following description, reference is made to the accompanying drawings that illustrate several examples of the present invention. It is understood that other examples may be utilized and various operational changes may be made without departing from the scope of the present disclosure. The following detailed description is not to be taken in a limiting sense, and the scope of the embodiments of the present invention is defined only by the claims of the issued patent.

Devices with integrated processing capabilities are often configured with network communication capability and/or other computing functions allowing the devices to send data to and/or receive data from other devices. In some examples, such devices may include voice-enabled personal assistants and/or other natural language processing interfaces that may be used to control the devices, answer questions, communicate with other people/devices, and/or otherwise interact with the devices and/or other devices. As such devices become more and more prevalent in both the home, office, public spaces, quasi-public spaces (e.g., hotels, offices, retail spaces), and elsewhere generally, and as the technology matures, new services and features are being developed. For instance, in some cases devices may be paired or otherwise grouped together with one another to enable certain functionality. For example, a device that includes voice-based personal assistant functionality may be paired with a device including a display so that spoken commands may be used to control content output by the display device. In another example, content may be transferred from one device to another device in response to user requests and/or other triggering events (e.g., If This Then That (IFTTT) recipes, presence information, etc.).

Speaker diarization refers to the task of portioning an audio stream that includes audio from multiple speakers into homogeneous segments associated with each speaker. In other words, speaker diarization is the task of determining "who spoke when?" in an input stream of audio that includes multiple speakers. Speaker diarization can be used in combination with automatic speech recognition to generate a transcript of multi-speaker audio where portions of the transcript that were spoken by a given speaker can be consistently annotated with the same speaker identifier (ID) label (e.g., Speaker ID 1, Speaker ID 2, Speaker ID 3, and so on).

Conventional diarization systems typically consist of a cascade of several separate components: voice activity detection to detect the speech frames, speaker embedding extraction to transform the speech segments of audio into embeddings (e.g., discriminative feature representations of the underlying audio), and clustering the embeddings in a shared feature space to group speech regions by speaker identity. While such systems may be effective for long-form audio with an arbitrary number of speakers, these cascaded multi-module approaches may face challenges in handling overlapping speech and can suffer from error propagation across the modules.

To overcome the limitations of cascaded approaches, end-to-end neural diarization (EEND) formulates speaker diarization as a frame-wise multi-label classification task with permutation invariant training. EEND can naturally handle overlapping speech by allowing multiple speakers to be active simultaneously and is also fully supervised compared to the unsupervised clustering component of the cascaded approach. However, EEND and its variants have struggled to generalize to larger numbers of speakers and arbitrarily long conversations.

In order to apply EEND models to longer audios and larger number of speakers, some approaches have proposed hybrid frameworks that integrate EEND with conventional clustering-based approaches. These methods leverage the strong diarization capability of EEND for speaker labeling over short local windows while performing global clustering on speaker embeddings computed across the local windows. This hybrid approach can handle both overlapping speech locally and long conversations with an arbitrary number of speakers globally. Some EEND improvements have also focused on integrating additional embedding or attractor modules, which require specialized model architectures, loss functions, and/or data requirements. Moreover, in some real-world scenarios, creating and storing speaker embeddings (for hybrid EEND/clustering approaches) may implicate privacy issues as speaker-specific embeddings may be considered as voiceprints (e.g., personally identifiable information (PII) for individual users). In some instances, generation, use, and/or storage of such data may be impermissible.

In order to overcome these technical challenges, described herein are systems and techniques for embedding-free speaker diarization that are able to leverage the benefits of EEND while scaling to long-form audios with an arbitrary numbers of speakers. In order to achieve these technical benefits, the EEND system may be used for local diarization (across audio windows of limited duration) as well as for global diarization across local windows. This approach is referred to herein as local-global EEND, followed by embedding-free clustering. The proposed systems and methods therefore include local EEND, global EEND, and clustering. In the local EEND step, long audio is split into fixed-size windows (with each window including a set number of audio frames). EEND is used to perform diarization within each window. The global EEND step performs inter-window speaker ID label permutation by reapplying EEND to chunks formed by pairing speaker chunks across local windows. The global EEND step generates pairwise speaker similarity scores which may be used to generate an affinity matrix for the final clustering and global speaker labeling step, without using any speaker embeddings. The global speaker labels (e.g., global speaker label data) may be applied across different windows of the audio so that consistent speaker IDs are persisted over the entire audio.

Automatic speech recognition (ASR) is a field of computer science, artificial intelligence, and linguistics concerned with transforming audio data associated with speech into text data and/or other ASR output data representative of that speech. Natural language understanding (NLU) is a field of computer science, artificial intelligence, and linguistics concerned with enabling computers to derive meaning from text input containing natural language, resulting in specific executable command data (e.g., intent data) or other type of instructions. As described in further detail below, in some examples, NLU processing may include multiple different processes that may be executed for a given natural language input in order to determine a semantic interpretation of the natural language input. Natural language generation (NLG) is a computer-based process that may be used to produce natural language output. Text-to-speech (TTS) is a field of computer science, artificial intelligence, and linguistics concerned with enabling computers to output synthesized speech. ASR, NLU, NLG, and TTS may be used together as part of a natural language interface system. As used in, natural language input data may comprise audio data (e.g., representing a user request or command), text data, and/or other representation data representing natural language for input into a natural language processing system.

The various techniques described herein may be used in a variety of contexts, including in natural language processing enabled devices (e.g., devices employing voice control and/or speech processing "voice assistants") and/or systems. Examples of speech processing systems and/or voice-enabled personal assistants include the Siri system from Apple Inc. of Cupertino, California, voice-enabled actions invoked by the Bard and/or the Google Assistant systems from Google LLC of Mountain View, California, Dragon speech recognition software or the Copilot system from Microsoft of Redmond, Washington, the Alexa system from Amazon.com, Inc. of Seattle, Washington, etc. Other examples of smart home devices and/or systems that may use the various content-based voice targeting techniques described herein may include Google Nest Smarthome products from Google LLC, HomeKit devices from Apple Inc., various smart doorbells (e.g., with integrated cameras and/or natural language processing capability), etc. For example, some models of Ring camera-integrated doorbells include Alexa speech processing functionality to allow users to have a virtual assistant interact with people at the door to take messages, etc.

Natural language processing enabled devices may include one or more microphones (e.g., far-field microphone arrays) used to transform audio into electrical signals. Speech processing may then be performed, either locally by the speech processing enabled device, by one or more other computing devices communicating with the speech processing enabled device over a network, or by some combination of the natural language processing enabled device and the one or more other computing devices. In various examples, natural language processing enabled devices may include and/or may be configured in communication with speakers and/or displays effective to output information obtained in response to a user's spoken request or command, and/or to output content that may be of interest to one or more users.

Storage and/or use of data related to a particular person or device (e.g., device identifier data, device names, names of device groups, contextual data, and/or any personal data) may be controlled by a user using privacy controls associated with a speech processing enabled device and/or a companion application associated with a speech processing enabled device. Users may opt out of storage of personal, device state (e.g., a paused playback state, etc.), and/or contextual data and/or may select particular types of personal, device state, and/or contextual data that may be stored while preventing aggregation and storage of other types of personal, device state, and/or contextual data. Additionally, aggregation, storage, and use of personal, device state, and/or contextual information, as described herein, may be compliant with privacy controls, even if not legally subject to them. For example, personal, contextual, device state, and other data described herein may be treated as if it was subject to acts and regulations, such as the Health Insurance Portability and Accountability Act (HIPAA) and the General Data Protection Regulation (GDPR), even if it is not actually subject to these acts and regulations. In various examples, the device and/or device group names and/or any data captured by such devices may be used only in accordance with user permission, in compliance with any relevant laws and/or policies. Additionally, users may opt out of data collection, and/or may opt to delete some or all of the data used by the various techniques described herein, even where deletion or non-collection of various data may result in reduced functionality and/or performance of various aspects of the systems described herein.

In various examples, a natural language processing enabled device may include a wakeword detection component. The wakeword detection component may process audio data captured by microphones of the speech processing enabled device and may determine whether or not a keyword and/or phrase, which are collectively sometimes referred to herein as a "wakeword", is detected in the audio data. In some examples, when a wakeword is detected, the speech processing enabled device may enter a "sending mode," "audio capturing mode," and/or other type of processing mode in which audio detected by the microphones following the wakeword (e.g., data representing user request data spoken after the wakeword) may be sent to natural language processing computing component(s) (either locally or remotely) for further natural language processing (e.g., ASR, NLU, LLM inference, etc.). In various examples, the wakeword detection component may be used to distinguish between audio that is intended for the natural language processing system and audio that is not intended for the natural language processing system.

Machine learning techniques, such as those described herein, are often used to form predictions, solve problems, recognize objects in image data for classification, etc. In various examples, machine learning models may perform better than rule-based systems and may be more adaptable as machine learning models may be improved over time by retraining the models as more and more data becomes available. Accordingly, machine learning techniques are often adaptive to changing conditions. Deep learning algorithms, such as neural networks, are often used to detect patterns in data and/or perform tasks.

Generally, in machine learned models, such as neural networks, parameters control activations in neurons (or nodes) within layers of the machine learned models. The weighted sum of activations of each neuron in a preceding layer may be input to an activation function (e.g., a sigmoid function, a rectified linear units (ReLu) function, etc.). The result determines the activation of a neuron in a subsequent layer. In addition, a bias value can be used to shift the output of the activation function to the left or right on the x-axis and thus may bias a neuron toward activation.

Generally, in machine learning models, such as neural networks, after initialization, annotated training data may be used to generate a cost or "loss" function that describes the difference between expected output of the machine learning model and actual output. The parameters (e.g., weights and/or biases) of the machine learning model may be updated to minimize (or maximize) the cost. For example, the machine learning model may use a gradient descent (or ascent) algorithm to incrementally adjust the weights to cause the most rapid decrease (or increase) to the output of the loss function. The method of updating the parameters of the machine learning model is often referred to as back propagation.

FIG. 1 is a block diagram illustrating an example embedding-free speaker diarization system 100, in accordance with various aspects of the present disclosure. In various examples, a device 102 (e.g., a device that includes one or more microphones and/or audio frontend circuitry for capturing audio data 211 such as a natural language processing-enabled device) may be effective to capture audio (e.g., via one or more microphones) and/or natural language requests.

The audio data 211 may be separated into frames of input audio data 112 (where each frame may be a fixed duration of audio). At block 114 the frames of input audio data 112 may be separated into W windows each having the same length (in terms of time duration) to within an acceptable tolerance (e.g., +/−5%, 10% or some other desired value). At block 116, frame-level acoustic features may be extracted to generate a data representation of each frame (e.g., acoustic feature data). For example, a Mel spectrogram may be generated for each frame of the frames of input audio data 112 to represent the frequency spectrum of the audio of each frame over time. In various examples, the Mel spectrogram for each frame may be encoded into a numerical representation of the Mel spectrogram for that frame (e.g., Mel filterbank features and/or Mel-Frequency cepstral coefficients (MFCCs)).

At block 118, local EEND may be performed to generate local window speaker ID labels for each non-overlapping speaker frame of a given window W. Local EEND is described in further detail below in reference to FIG. 2A. While local EEND may output accurate speaker ID labels for each fixed-size audio window, local EEND does not provide any information about whether a given speaker ID label from a first window (e.g., speaker ID 1 from Window 1) corresponds to the same speaker (or a different speaker) from any other window (e.g., speaker ID 2 from Window 2). Accordingly, at block 120, global EEND performs inter-window speaker ID label permutation by reapplying EEND to chunks that are formed by pairing different speaker ID frames across different local windows. The global EEND step generates pairwise speaker similarity scores that may be used to generate an affinity matrix for the embedding-free clustering performed at block 122. Global EEND is described in further detail below in reference to FIG. 2B.

At block 122, embedding-free clustering clusters similarity scores from the affinity matrix to determine the global speaker IDs across windows. For example, the embedding-free clustering may be used to determine that speaker ID 1 from Window 1, speaker ID 4 from Window 2, and speaker ID 3 from Window 3 all pertain to the same speaker (on the basis of these three local speaker IDs having similar pairwise similarity scores, post clustering). The embedding-free clustering is described in additional detail below in reference to FIG. 3. At block 124, after performing the embedding-free clustering, global speaker labels can be applied at the frame level. In the foregoing example, all frames associated with local speaker ID 1 in Window 1, local speaker ID 4 in Window 2, and local speaker ID 3 from Window 3 may be labeled with the same global speaker ID label to indicate that these frames are associated with the same speaker.

Figure 2A:
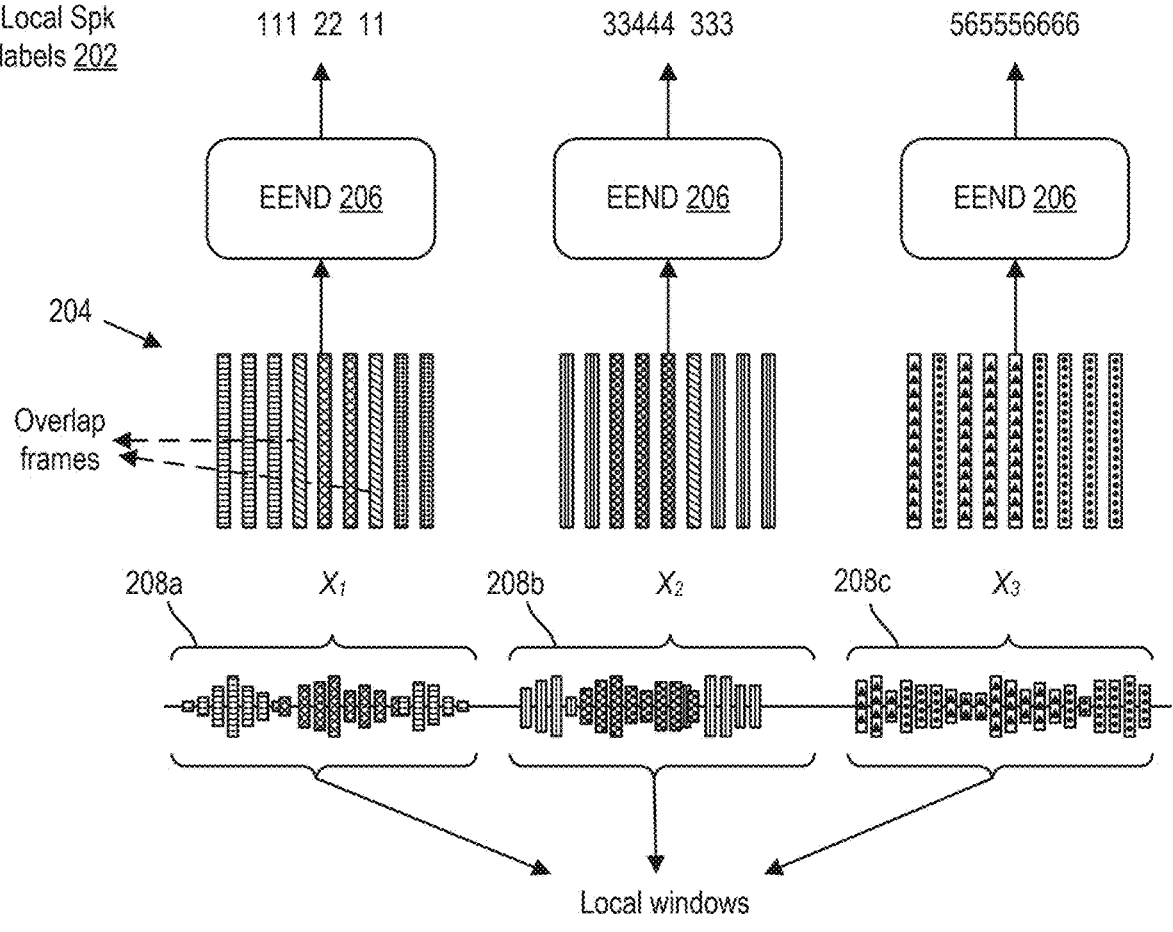
FIG. 2A is a diagram illustrating local embedding-free neural speaker diarization, in accordance with various aspects of the present disclosure.

FIG. 2A is a diagram illustrating local embedding-free neural speaker diarization, in accordance with various aspects of the present disclosure. The input audio (e.g., frames of input audio data 112) may first be split into W windows with a fixed window length (e.g., windows 208a, 208b, 208c, etc.). In each window i, frame-level acoustic features 204 (e.g., Mel-filterbank features) may be extracted, denoted as $$X_i = \{x_{i,t}\}_{t=1}^T, x_{i,t} \in \mathbb{R}^F$$

where t is the frame index, T is the total number of frames in a window, and F is the feature dimension of Mel-filterbank features or other feature representations. The feature representations and their dimensionality may vary according to the desired implementation. Speaker label $y_{i,t} = \{y_{i,t,s}\}_{s=1}^{S_{local}}$ denotes speech activities for $S_{local}$ speakers at frame t within window i and may be defined as:

$$y_{i,t,s} = \begin{cases} 0 & (\text{Speaker } s \text{ is inactive at } t) \\ 1 & (\text{Speaker } s \text{ is active at } t) \end{cases} \quad (1)$$

The per-frame speaker labels $y_{i,t}$ may be described as "local" speaker labels (or local speaker ID labels) as they are generated using EEND 206 per-window. EEND 206 may be a neural-network-based end-to-end speaker diarization machine learning model such as that described by Y. Fujita, N. Kanda, S. Horiguchi, K. Nagamatsu, and S. Watanabe, "End-to-end neural speaker diarization with permutation-free objectives," in *Interspeech*, 2019, pp. 4300-4304. As previously described, when used in isolation for speaker diarization, EEND 206 may struggle to generalize to larger numbers of speakers and arbitrarily long audio inputs (e.g., long-form audio).

The local EEND illustrated in FIG. 2A estimates frame-wise posteriors $P(y_{i,t,s}|X_i)$ in each window using EEND 206. These posteriors may be binarized using a threshold $Th_{local}$ and median filtered to obtain the local speaker labels $y_{i,t}$ (e.g., local speaker labels 202). In FIG. 2A different shading patterns in the frame-level acoustic features 204 represent different speakers. Frames in which there is overlapping speech (e.g., from multiple speakers) is represented in FIG. 2A using diagonal stripes (e.g., "overlap frames"). Additionally, in the example depicted in FIG. 2A, there are three local windows (e.g., windows 208*a*, 208*b*, and 208*c*) with each window representing two speakers. Within a single window, local EEND is able to distinguish between frames corresponding to different speakers. However, local EEND does not make cross window predictions. For example, while it is known that local speaker label 1 represents a different speaker from local speaker label 2 (for window 208*a*), it is not known if local speaker label "1" represents the same speaker as local speaker label 3, 4, 5, or 6 since local speaker label "1" is from window 208*a*, while local speaker labels 3, 4, 5, and 6 are from different windows.

Figure 2B:
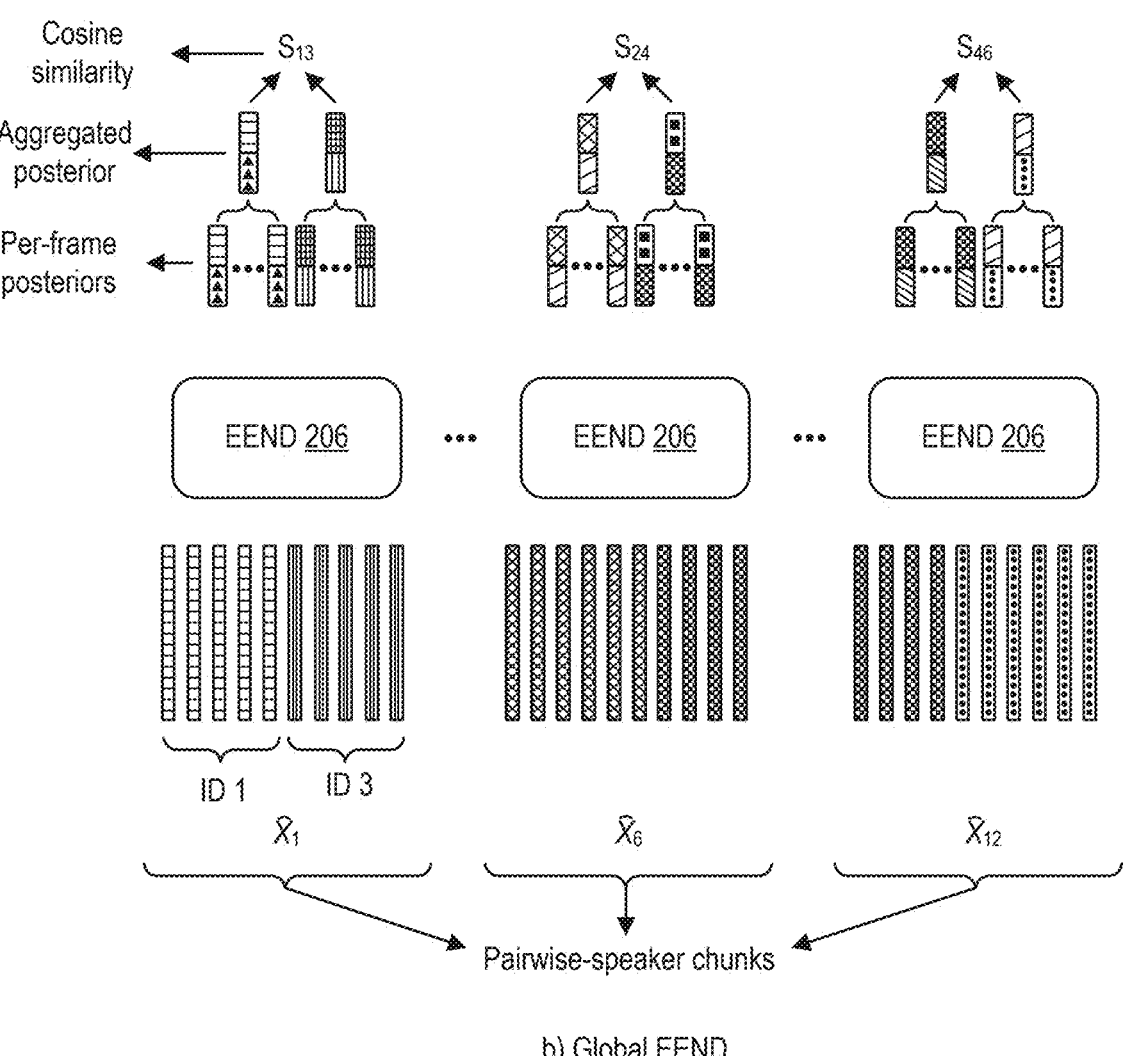
FIG. 2B is a diagram illustrating global, embedding-free neural speaker diarization, in accordance with various aspects of the present disclosure.

FIG. 2B is a diagram illustrating global, embedding-free neural speaker diarization, in accordance with various aspects of the present disclosure. In order to perform global SD, the global EEND step depicted in FIG. 2B computes the speaker similarities across the local windows using the same EEND model (EEND 206) as used by local EEND (in FIG. 2A). In order to compute the pairwise speaker similarities, the overlapping speaker frames within each local window (overlap frames of FIG. 2A) are first filtered out and the remaining frames of each speaker in a window are paired with the frames of speakers in subsequent windows, resulting in new chunks $$\{\hat{X}_i\}_{i=1}^{C}.$$

In the local EEND example of FIG. 2A there are three local windows (e.g., windows 208*a*, 208*b*, and 208*c*) with each window representing two speakers. Accordingly, in FIG. 2B, there are C=12 pairwise speaker permutations ("chunks") for the global EEND, given by:

$$\hat{X}_i = concat\left(x_{j,t}\middle|t = \{m_{j,s}\}_{s=1}^{M},\ x_{k,t}\middle|t = \{n_{k,s}\}_{s=1}^{N}\right) \quad (2)$$

where $x_{j,t}$ and $x_{k,t}$ represent frame-level acoustic features of window $j$ and window $k$, respectively.

$$\{m_{j,s}\}_{s=1}^{M}$$

represents the M frame indices corresponding to speaker m in window j and $$\{n_{k,s}\}_{s=1}^{N}$$

represents the N frame indices corresponding to speaker n in window k. C is the total number of pairwise-speaker chunks processed by global EEND, where $$C \le W \times (W-1)/2 \times S_{local}^{2} \quad (3)$$

EEND is applied to $\hat{X}_i$ (e.g., to the Mel-filterbank features of the input frames) to generate inter-window frame-level speaker posteriors ($P(y_{i,t,s}|\hat{X}_i)$):

$$[z_1, \ldots, z_M, z_{M+1}, \ldots, z_{M+N}] = EEND(\hat{X}_i) \quad (4)$$

where $$\{z_c\}_{t=1}^{M+N},\ z_t \in \mathbb{R}^{S_{local}}$$

are the inter-window frame level posteriors (e.g., per-frame posteriors). $[z_1, \ldots, z_M]$ and $[z_{M+1}, \ldots, z_{M+N}]$ are the posteriors corresponding to the M frames of speaker m and N frames of speaker n respectively. This process is repeated on each speaker pair across local windows from FIG. 2A. For example, in chunk $\hat{X}_1$ in FIG. 2B, frames of window 208*a* labeled with local speaker ID 1 ("ID 1" in FIG. 2B) are paired with frames of window 208*b* labeled with local speaker ID 3 ("ID 3" in FIG. 2B). Frame-level posteriors differ from embeddings in that the frame-level posteriors are not encoded representations of the speech of the different speakers, but are instead the conditional probabilities that a frame is associated with the different speaker ID labels given the input chunk.

The per-frame posteriors $$\{z_t\}_{t=1}^{M+N}$$

may be aggregated on frames belonging to the same speaker (e.g., having the same local speaker ID label), resulting in speaker-level posteriors $\bar{z}_m$ and $\bar{z}_n$. Pairwise-speaker similarity $S_{mn}$ may then be calculated as $$\bar{z}_m = mean([z_1, \ldots, z_M]) \quad (5)$$

$$\bar{z}_n = mean([z_{M+1}, \ldots, z_N]) \quad (6)$$

$$S_{mn} = cosine\_similarity(\bar{z}_m, \bar{z}_n) \quad (7)$$

It should be noted that while cosine similarity is used as a similarity/distance metric in the foregoing example, that any desired distance/similarity metric may be used (e.g., Euclidean distance, cosine distance, Jaccard similarity, etc.) in accordance with the desired implementation.

Figure 3:
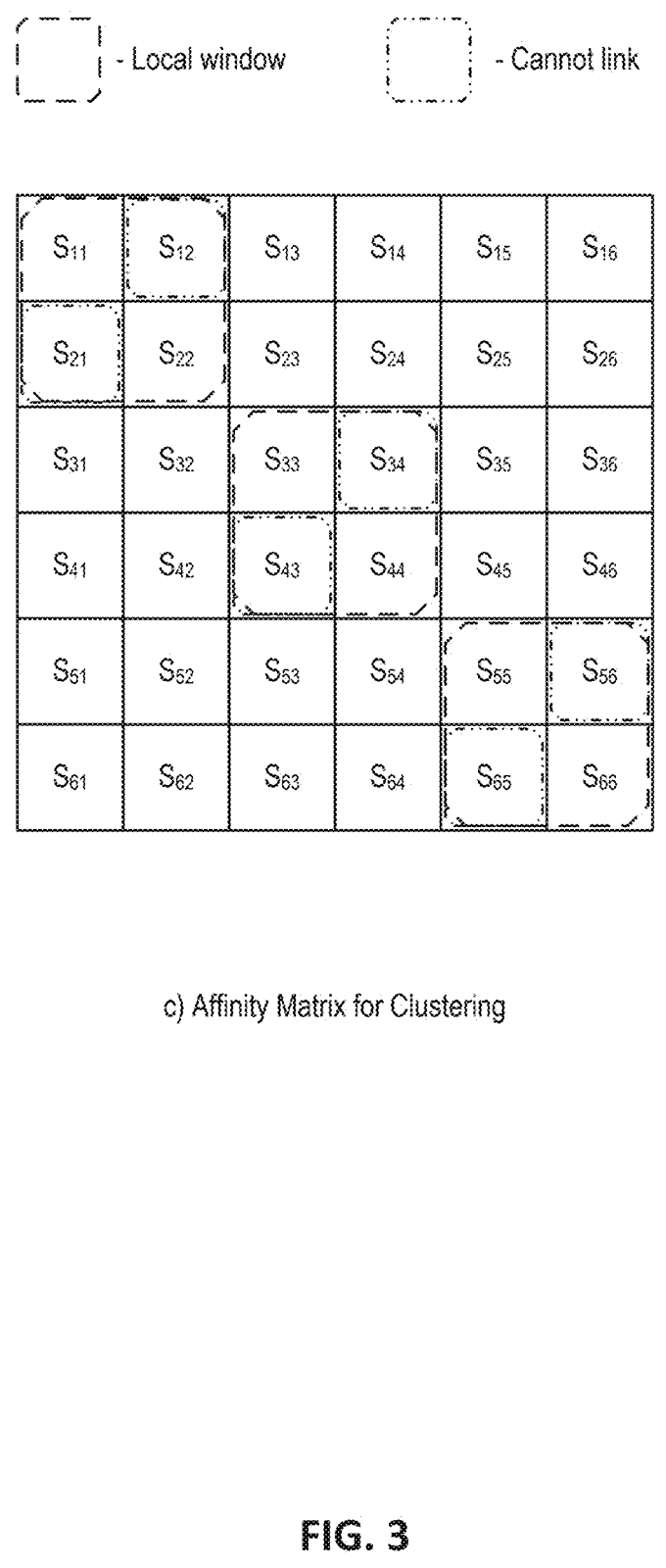

FIG. 3 depicts an example of similarity clustering for embedding-free neural speaker diarization, in accordance with various aspects of the present disclosure. Each pairwise similarity $S_{mn}$ generated using global EEND (FIG. 2B) is an entry of the affinity matrix $S \in \mathbb{R}^{S_{Global} \times S_{Global}}$ (illustrated in FIG. 3) which may be used for the final clustering, where $S_{Global}$ is the sum of number of speakers detected in each local window with the local EEND, the upper bound of which is $W \times S_{local}$.

In order to enhance the clustering performance and to save on additional computations, cannot-link constraints may be incorporated among different speakers identified within the same local window obtained in the local EEND step. This constraint is enforced by assigning a speaker similarity of 0 between local speaker pairs. Spectral clustering (or any other desired clustering technique (e.g., K-nearest neighbors, K-means, etc.)) may then be used to group the speaker frames into D speaker sets (e.g., using the max eigengap heuristic when using spectral clustering). For example, if $S_{13}$ is clustered together with $S_{35}$, this may indicate that local speaker ID labels 1, 3, and 5 pertain to the same speaker across windows of the audio. Global speaker ID labels (global speaker labels) may be applied across the local windows to maintain speaker identity information for the longform audio.

Figure 4:
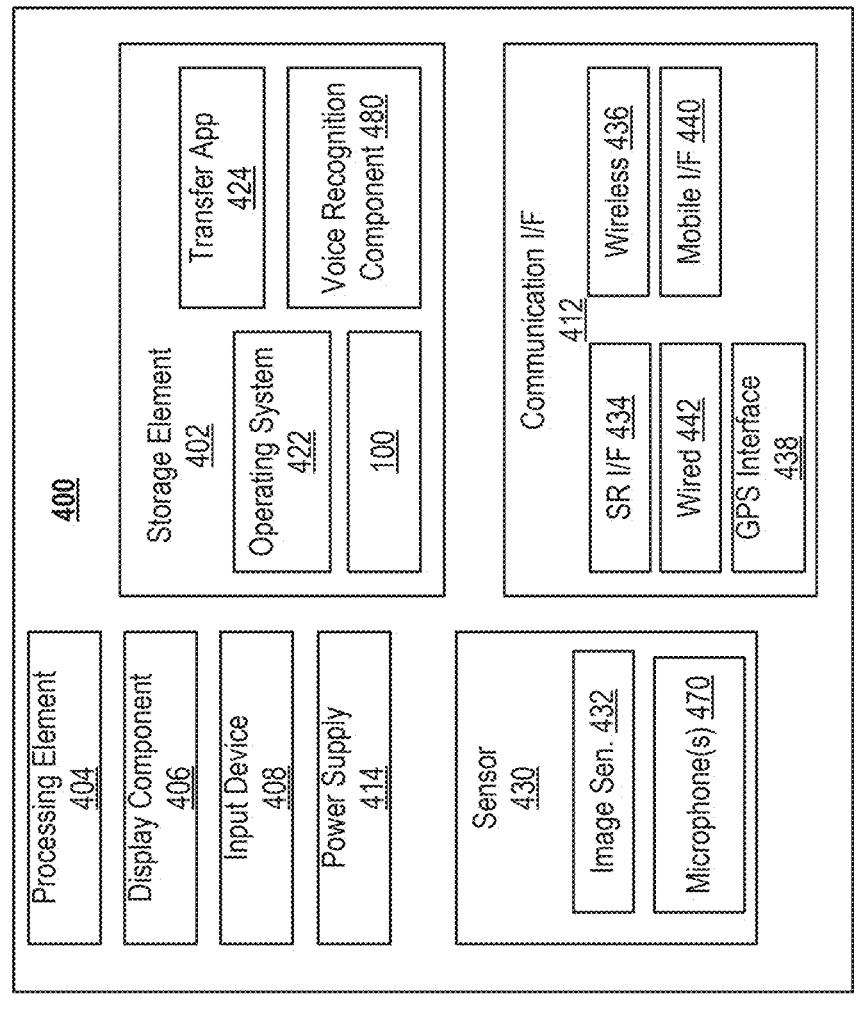
FIG. 4 is a block diagram showing an example architecture of a network-connected device that may be used in accordance with various embodiments described herein.

FIG. 4 is a block diagram showing an example architecture 400 of a network-connected device (e.g., a local network-connected device) that may be used to implement, at least in part, the embedding-free speaker diarization system 100, in accordance with various aspects of the present disclosure. It will be appreciated that not all devices will include all of the components of the architecture 400 and some user devices may include additional components not shown in the architecture 400. The architecture 400 may include one or more processing elements 404 for executing instructions and retrieving data stored in a storage element 402. The processing element 404 may comprise at least one processor. Any suitable processor or processors may be used. For example, the processing element 404 may comprise one or more digital signal processors (DSPs). In some examples, the processing element 404 may be effective to determine a wakeword and/or to stream audio data to a speech processing system. The storage element 402 can include one or more different types of memory, data storage, or computer-readable storage media devoted to different purposes within the architecture 400. For example, the storage element 402 may comprise flash memory, random-access memory, disk-based storage, etc. Different portions of the storage element 402, for example, may be used for program instructions for execution by the processing element 404, storage of images or other digital works, and/or a removable storage for transferring data to other devices, etc. In various examples, the storage element 402 may store computer-executable instructions effective to implement one or more operations of embedding-free speaker diarization system 100, such as the EEND 206 (and/or parameters thereof), the various computer-executable instructions for local and/or global EEND, and/or for the final clustering of FIG. 3.

The storage element 402 may also store software for execution by the processing element 404. An operating system 422 may provide the user with an interface for operating the computing device and may facilitate communications and commands between applications executing on the architecture 400 and various hardware thereof. A transfer application 424 may be configured to receive images, audio, and/or video from another device (e.g., a mobile device, image capture device, and/or display device) or from an image sensor 432 and/or microphone 470 included in the architecture 400. In some examples, the transfer application 424 may also be configured to send the received voice requests to one or more voice recognition servers.

When implemented in some user devices, the architecture 400 may also comprise a display component 406. The display component 406 may comprise one or more light-emitting diodes (LEDs) or other suitable display lamps. Also, in some examples, the display component 406 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 406 may be effective to display content determined provided by a skill executed by the processing element 404 and/or by another computing device.

The architecture 400 may also include one or more input devices 408 operable to receive inputs from a user. The input devices 408 can include, for example, a push button, touch pad, touch screen, wheel, joystick, keyboard, mouse, trackball, keypad, light gun, game controller, or any other such device or element whereby a user can provide inputs to the architecture 400. These input devices 408 may be incorporated into the architecture 400 or operably coupled to the architecture 400 via wired or wireless interface. In some examples, architecture 400 may include a microphone 470 or an array of microphones for capturing sounds, such as voice requests. Voice recognition component 480 may interpret audio signals of sound captured by microphone 470. In some examples, voice recognition component 480 may listen for a "wakeword" to be received by microphone 470. Upon receipt of the wakeword, voice recognition component 480 may stream audio to a voice recognition server for analysis, such as a speech processing system. In various examples, voice recognition component 480 may stream audio to external computing devices via communication interface 412.

When the display component 406 includes a touch-sensitive display, the input devices 408 can include a touch sensor that operates in conjunction with the display component 406 to permit users to interact with the image displayed by the display component 406 using touch inputs (e.g., with a finger or stylus). The architecture 400 may also include a power supply 414, such as a wired alternating current (AC) converter, a rechargeable battery operable to be recharged through conventional plug-in approaches, or through other approaches such as capacitive or inductive charging.

The communication interface 412 may comprise one or more wired or wireless components operable to communicate with one or more other computing devices. For example, the communication interface 412 may comprise a wireless communication module 436 configured to communicate on a network, such as a computer communication network, according to any suitable wireless protocol, such as IEEE 802.11 or another suitable wireless local area network (WLAN) protocol. A short range interface 434 may be configured to communicate using one or more short range wireless protocols such as, for example, near field communications (NFC), Bluetooth, Bluetooth LE, etc. A mobile interface 440 may be configured to communicate utilizing a cellular or other mobile protocol. A Global Positioning System (GPS) interface 438 may be in communication with one or more earth-orbiting satellites or other suitable position-determining systems to identify a position of the architecture 400. A wired communication module 442 may be configured to communicate according to the USB protocol or any other suitable protocol.

The architecture 400 may also include one or more sensors 430 such as, for example, one or more position sensors, image sensors, and/or motion sensors. An image sensor 432 is shown in FIG. 4. An example of an image sensor 432 may be a camera configured to capture color information, image geometry information, and/or ambient light information.

Figure 5:
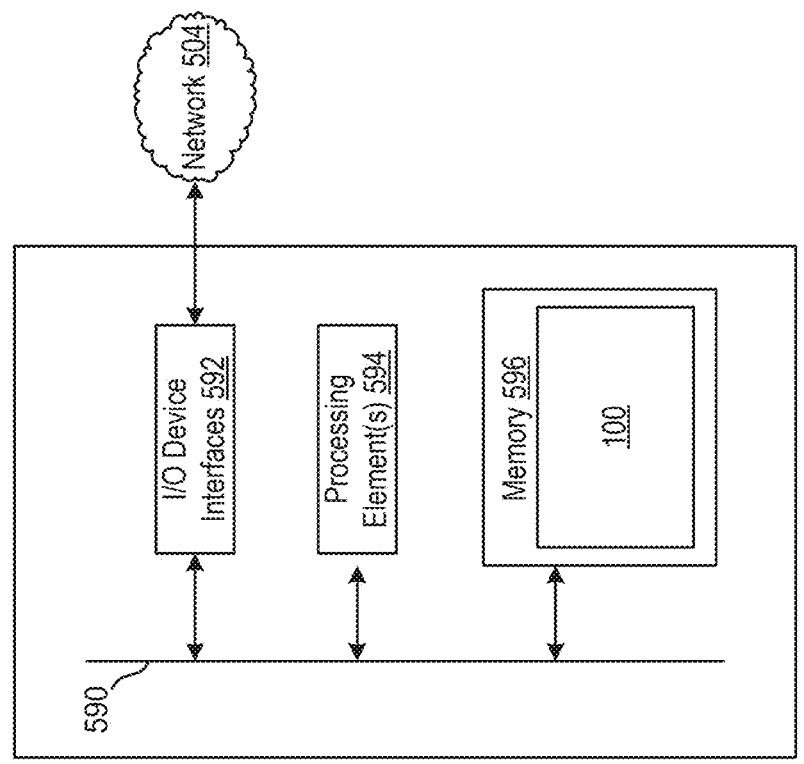
FIG. 5 is a block diagram showing an example architecture of a computing device that may be used in accordance with various embodiments described herein.

FIG. 5 is a block diagram conceptually illustrating example components of a remote device, such as a computing device executing embedding-free speaker diarization system 100 and/or command processing related to embedding-free speaker diarization system 100. Multiple computing devices may be included in the system, such as one or more computing devices for computing local EEND processing, one or more computing devices for performing global EEND processing, one or more computing devices for clustering processing, etc. In operation, each of these devices (or groups of devices) may include non-transitory computer-readable and computer-executable instructions that reside on the respective device, as will be discussed further below. The remote device of FIG. 5 may communicate with one or more other devices over a network 504 (e.g., a wide area network or local area network).

Each computing device of the various systems described herein may include one or more controllers/processors 594, which may each include at least one central processing unit (CPU) for processing data and computer-readable instructions, and a memory 596 for storing data and instructions of the respective device. In at least some examples, memory 596 may store, for example, a list of N-best intents data that may be generated for particular request data. In some examples, memory 596 may store machine learning models and/or other components and/or instructions used to implement the embedding-free speaker diarization system 100, when loaded from memory 596. In various further examples, memory 596 may be effective to store instructions effective to program controllers/processors 594 to perform the various techniques described above in reference to FIGS. 1-3. Accordingly, in FIG. 5, embedding-free speaker diarization system 100 is depicted as being stored within memory 596, as an example. The memories 596 may individually include volatile random access memory (RAM), non-volatile read only memory (ROM), non-volatile magnetoresistive memory (MRAM), and/or other types of memory. Each computing device of a speech processing system (and/or a component thereof) may also include memory 596 for storing data and controller/processor-executable instructions. Each memory 596 may individually include one or more non-volatile storage types such as magnetic storage, optical storage, solid-state storage, etc. Each computing device of a speech processing system may also be connected to removable or external non-volatile memory and/or storage (such as a removable memory card, memory key drive, networked storage, etc.) through respective input/output device interfaces 592. In various examples, the feature data and/or training data used by the various machine learning models may be stored and/or cached in memory 596.

Computer instructions for operating each computing device of embedding-free speaker diarization system 100 may be executed by the respective device's controllers/processors 594, using the memory 596 as temporary "working" storage at runtime. A device's computer instructions may be stored in a non-transitory manner in non-volatile memory 596 (e.g., a non-transitory computer-readable memory), memory 596, or an external device(s). Alternatively, some or all of the executable instructions may be embedded in hardware or firmware on the respective device in addition to or instead of software.

A variety of components may be connected through the input/output device interfaces 592, as will be discussed further below. Additionally, each computing device of a speech processing system may include an address/data bus 590 for conveying data among components of the respective device. Each component within a computing device of embedding-free speaker diarization system 100 may also be directly connected to other components in addition to (or instead of) being connected to other components across the bus 590.

As noted above, multiple devices may be employed in a single system. In such a multi-device system, each of the devices may include different components for performing different aspects of the system's processing. The multiple devices may include overlapping components. The components of a speech processing system, as described herein, are exemplary, and may be located as a stand-alone device or may be included, in whole or in part, as a component of a larger device or system.

Figure 6:
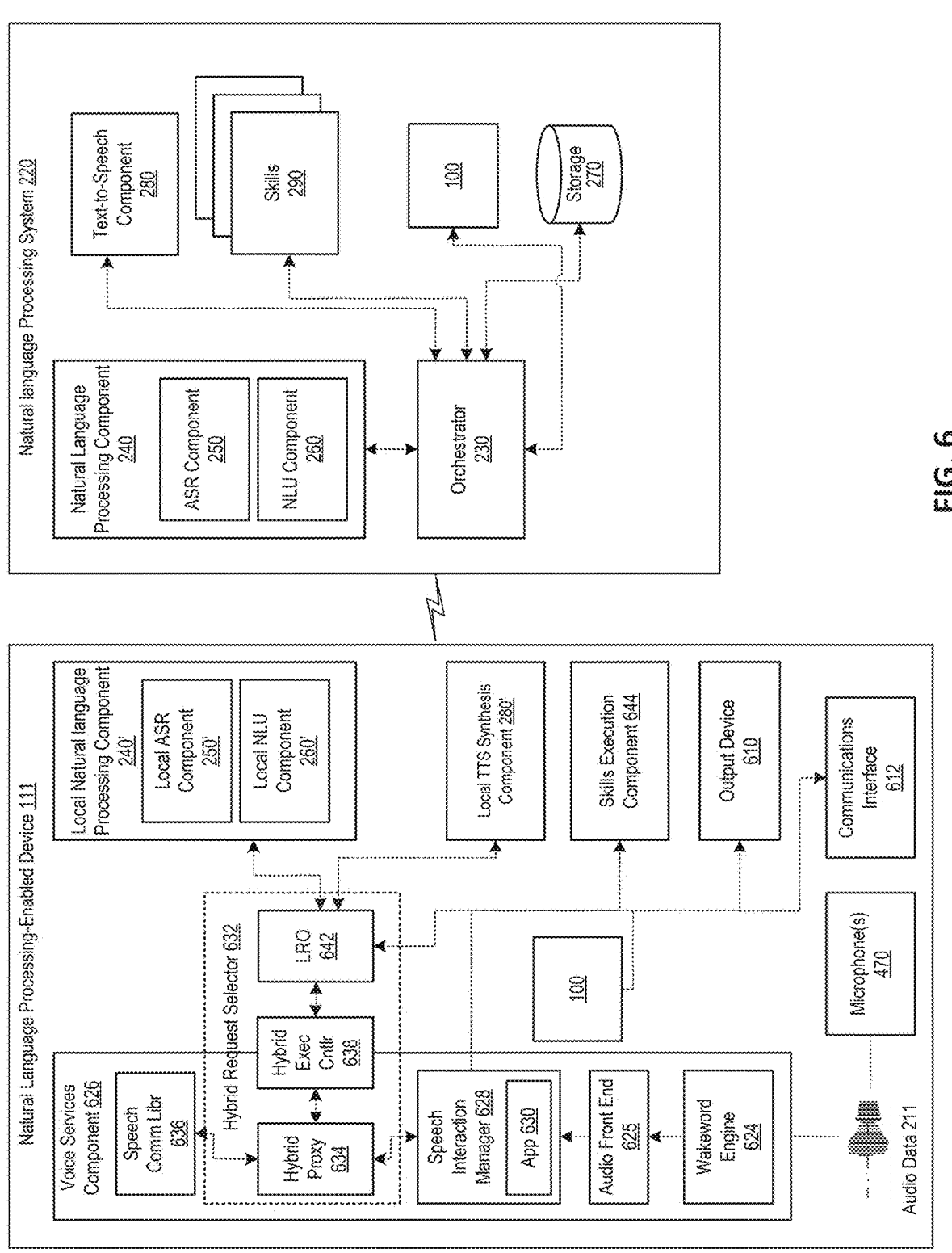
FIG. 6 is a block diagram illustrating a natural language processing-enabled device and a natural language processing management system that may be used in accordance with embodiments of the present disclosure.

FIG. 6 is a block diagram illustrating a device 111 (e.g., a natural language processing enabled device) and a natural language processing system 220, in accordance with embodiments of the present disclosure. In various examples, the device 111 may be an example of a device that may be configured to receive audio on which embedding-free neural speaker diarization may be performed. In various examples, device 111 may be a natural language processing-enabled device and may include microphones (e.g., far-field microphone arrays) used to transform audio into electrical signals. The device 111 may be among the network-connected devices described herein that are local to (e.g., communicating on the same LAN) one or more other network-connected devices. Natural language processing may then be performed, either locally by the natural language processing components of device 111, by one or more other computing devices communicating with the device 111 over a network (e.g., natural language processing system 220), or by some combination of the device 111 and the one or more other computing devices. In various examples, device 111 may include and/or may be configured in communication with output device(s) 610 (e.g., speakers, displays, and/or other network connected devices) effective to output information obtained in response to a user's spoken request or command, or to output content that may be of interest to one or more users. As used herein, a display of the device 111 refers to a display effective to output graphics such as images and/or video. Further, as used herein, a displayless device refers to a device that does not include a display that is effective to render graphical images or text.

In various examples, the device 111 may include and/or may be configured in communication with a component executing embedding-free speaker diarization system 100. A natural language processing-enabled computing system may respond to user utterances by outputting content and/or performing one or more other actions, such as playing music, providing information, calling a taxi, displaying an image, etc. Generally, input data received by the various natural language processing systems and components described herein may comprise natural language input data. Natural language input data may be in the form of audio data representing spoken user utterances (e.g., a spoken user request), text data (e.g., a request typed by a user), gesture data (e.g., data representing a user shaking their head while wearing ear buds, making a hand gesture, etc.), and/or some combination of text data, gesture data, and/or audio data.

Speech-processing systems may be configured with multiple applications (e.g., thousands, tens of thousands, or more applications) that can be used to potentially respond to a user request. Applications may be referred to herein as "skills." Natural language processing systems may be effective to process spoken and/or textual natural language inputs to determine data representing a semantic understanding of the inputs. Skills may include any application effective to communicate with a natural language processing system in order to take one or more actions based on inputs from the natural language processing system. For example, a speech-processing system may include music skills, video skills, calendar skills, timer skills, general knowledge answering skills, game skills, device control skills, etc. As described herein, skills receive NLU data comprising slot data and/or intent data and are configured to determine one or more actions based on the slot data and/or intent data. Examples of such actions may include text to be processed into output audio data (e.g., synthetic speech) via a text-to-speech (TTS) component, an executable command effective to play a song from a music service, a movie from a movie service, or the like, an executable command effective to cause a system to perform an action (e.g., turning lights on/off, controlling an appliance, purchasing an item, etc.). In various other examples, a speech processing system may employ a large language model (LLM) and the LLM may call various APIs of third party services in order to respond to input requests.

In addition to using the microphone(s) 470 to capture utterances and convert them into digital audio data 211, the device 111 may additionally, or alternatively, receive audio data 211 (e.g., via the communications interface 612) from another device in the environment. In various examples, the device 111 may capture video and/or other image data using a camera. Under normal conditions, the device 111 may operate in conjunction with and/or under the control of a remote, network-based or network-accessible natural language processing system 220. The natural language processing system 220 may, in some instances, be part of a network-accessible computing platform that is maintained and accessible via a wide area network (WAN). Network-accessible computing platforms such as this may be referred to using terms such as "on-demand computing", "software as a service (SaaS)", "platform computing", "network-accessible platform", "cloud services", "data centers", and so forth. The natural language processing system 220 may be configured to provide particular functionality to large numbers of local (e.g., in-home, in-car, etc.) devices of different users. The WAN is representative of any type of public or private, wide area network, such as the Internet, which extends beyond the environment of the device 111. Thus, the WAN may represent and/or include, without limitation, data and/or voice networks, a wired infrastructure (e.g., coaxial cable, fiber optic cable, etc.), a wireless infrastructure (e.g., radio frequencies (RF), cellular, satellite, etc.), and/or other connection technologies.

In some embodiments, the natural language processing system 220 may be configured to receive audio data 211 from the device 111, to recognize speech in the received audio data 211, and to perform functions in response to the recognized speech. In some embodiments, these functions involve sending a command, from the natural language processing system 220, to the device 111 to cause the device 111 to perform an action, such as output an audible response to the user speech via output device 610 (e.g., one or more loudspeakers). Thus, under normal conditions, when the device 111 is able to communicate with the natural language processing system 220 over a WAN (e.g., the Internet), some or all of the functions capable of being performed by the natural language processing system 220 may be performed by sending a command over a WAN to the device 111, which, in turn, may process the command for performing actions. For example, the natural language processing system 220, via a remote command that is included in remote response data, may instruct the device 111 to output an audible response (e.g., using a local text-to-speech (TTS) synthesis component 280 or TTS component 280') to a user's question, to output content (e.g., music) via output device 610 (e.g., one or more loudspeakers) of the device 111, or to control other devices in the local environment (e.g., the user's home). It is to be appreciated that the natural language processing system 220 may be configured to provide other functions, in addition to those discussed herein, such as, without limitation, providing step-by-step directions for navigating from an origin to a destination location, conducting an electronic commerce transaction on behalf of a user as part of a shopping function, establishing a communication session between the current user and another user, etc.

In order to process voice commands locally, the device 111 may include a local voice services component 626. When a user utterance including the wakeword is captured by the microphone 470 of the device 111, the audio data 211 representing the utterance is received by a wakeword engine 624 of the voice services component 626. The wakeword engine 624 may be configured to compare the audio data 211 to stored models used to detect a wakeword (e.g., "Computer") that indicates to the device 111 that the audio data 211 is to be processed for determining an intent. Thus, the wakeword engine 624 is configured to determine whether a wakeword is detected in the audio data 211, and, if a wakeword is detected, the wakeword engine 624 can proceed with routing the audio data 211 to an audio front end (AFE) 625 (sometimes referred to as an acoustic front end (AFE)) of the voice services component 626. If a wakeword is not detected in the audio data 211, the wakeword engine 624 can refrain from sending the audio data 211 to the AFE 625, thereby preventing the audio data 211 from being further processed. The audio data 211 can be discarded.

The AFE 625 is configured to transform the audio data 211 received from the wakeword engine 624 into data for processing by a suitable ASR component and/or NLU component. The AFE 625 may reduce noise in the audio data 211 and divide the digitized audio data 211 into frames representing a time intervals for which the AFE 625 determines a number of values, called features, representing the qualities of the audio data 211, along with a set of those values, called a feature vector, representing the features/qualities of the audio data 211 within the frame. Many different features may be determined, and each feature represents some quality of the audio data 211 that may be useful for ASR processing and/or NLU processing. A number of approaches may be used by the AFE 625 to process the audio data 211, such as mel-frequency cepstral coefficients (MFCCs), perceptual linear predictive (PLP) techniques, neural network feature vector techniques, linear discriminant analysis, semi-tied covariance matrices, or other approaches known to those of skill in the art. In some embodiments, the AFE 625 is configured to use beamforming data to process the received audio data 211. Beamforming can be used to distinguish between the directions from which speech and noise originate. Accordingly, the microphones 470 may be arranged in a beamforming array to receive multiple audio signals, where multiple audio sources including speech may be identified in different beams and processed. Beamforming may involve processing multiple audio signals (e.g., originating from multiple microphones in a microphone array) together, such as by time shifting one audio signal with respect to another audio signal, to increase the signal and decrease the noise in the audio. Time offsets in the audio data 211, used by the AFE 625 in beamforming, may be determined based on results of the wakeword engine 624's processing of the audio data 211. For example, the wakeword engine 624 may detect the wakeword in the audio data 211 from a first microphone 470 at time, t, while detecting the wakeword in the audio data 211 from a second microphone 470 a millisecond later in time (e.g., time, t+1 millisecond), and so on and so forth, for any suitable number of audio signals corresponding to multiple microphones 470 in a microphone array.

A speech interaction manager (SIM) 628 of the voice services component 626 may receive the audio data 211 that has been processed by the AFE 625. The SIM 628 may manage received audio data 211 by processing request data and non-speech noise or sounds as events, and the SIM 628 may also manage the processing of commands that are used to respond to the user speech or non-speech noise or sounds (e.g., by controlling the action(s) of natural language processing components of device 111). The SIM 628 may include one or more client applications 630 for performing various functions at the device 111.

A hybrid request selector component 632 of the device 111 is shown as including a hybrid proxy component (HP) 634, among other components. The HP 634 can be implemented as a layer within the voice services component 626 that is located between the SIM 628 and a speech communication library (SCL) 636, and may be configured to proxy traffic to/from the natural language processing system 220. For example, the HP 634 may be configured to pass messages between the SIM 628 and the SCL 636 (such as by passing events and instructions there between), and to send messages to/from a hybrid execution controller component (HEC) 638 of the hybrid request selector component 632. For instance, command data received from the natural language processing system 220 can be sent to the HEC 638 using the HP 634, which sits in the path between the SCL 636 and the SIM 628. The HP 634 may also be configured to allow audio data 211 received from the SIM 628 to pass through to the natural language processing system 220 (via the SCL 636) while also receiving (e.g., intercepting) this audio data 211 and sending the received audio data 211 to the HEC 638 (sometimes via an additional SCL).

As will be described in more detail below, the HP 634 and the HEC 638 are configured to perform a handshake procedure to connect to each other. As part of this handshake procedure, the HP 634 and the HEC 638 exchange data including, without limitation, configurations, context, settings, device identifiers (ID), networking protocol versions, time zones, and language data (sometimes referred to herein as "locale data"). Based on at least some of this data (e.g., based at least in part on the language data) exchanged during the handshake procedure, the HEC 638 determines whether to accept or reject the connection request from the HP 634. If the HEC 638 rejects the HP's 634 connection request, the HEC 638 can provide metadata to the HP 634 that provides a reason why the connection request was rejected.

A local natural language processing component 240' (sometimes referred to as a "natural language processing component," a "spoken language understanding (SLU) component," a "speech engine," or an "engine") is configured to process audio data 211 (e.g., audio data 211 representing user speech, audio data 211 representing non-speech noise or sounds, etc.). In some embodiments, the hybrid request selector component 632 may further include a local request orchestrator component (LRO) 642. The LRO 642 is configured to notify the local natural language processing component 240' about the availability of new audio data 211 that represents user speech, and to otherwise initiate the operations of the local natural language processing component 240' when new audio data 211 becomes available. In general, the hybrid request selector component 632 may control the execution of the local natural language processing component 240', such as by sending "execute" and "terminate" events/instructions to the local natural language processing component 240'. An "execute" event may instruct the local natural language processing component 240' to continue any suspended execution based on audio data 211 (e.g., by instructing the local natural language processing component 240' to execute on a previously-determined intent in order to generate a command). Meanwhile, a "terminate" event may instruct the local natural language processing component 240' to terminate further execution based on the audio data 211, such as when the device 111 receives command data from the natural language processing system 220 and chooses to use that remotely-generated command data.

The LRO 642 may interact with a skills execution component 644 that is configured to receive intent data output from the local natural language processing component 240' and to execute a skill based on the intent.

To illustrate how the device 111 can operate at runtime, consider an example where a user utters an expression, such as "Computer, turn off the kitchen lights." The audio data 211 is received by the wakeword engine 624, which detects the wakeword "Computer," and forwards the audio data 211 to the SIM 628 via the AFE 625 as a result of detecting the wakeword. The SIM 628 may send the audio data 211 to the HP 634, and the HP 634 may allow the audio data 211 to pass through to the natural language processing system 220 (e.g., via the SCL 636), and the HP 634 may also input the audio data 211 to the local natural language processing component 240' by routing the audio data 211 through the HEC 638 of the hybrid request selector 632, whereby the LRO 642 notifies the local natural language processing component 240' of the incoming audio data 211. At this point, the hybrid request selector 632 may wait for response data from the natural language processing system 220 and/or the local natural language processing component 240'.

The local natural language processing component 240' is configured to receive the audio data 211 from the hybrid request selector 632 as input, to recognize speech (and/or non-speech audio events) in the audio data 211, to determine an intent (e.g., user intent) from the recognized speech (or non-speech audio event). This intent can be provided to the skills execution component 644 via the LRO 642, and the skills execution component 644 can determine how to act on the intent by generating directive data. In some cases, a directive may include a description of the intent (e.g., an intent to turn off {device A}). In some cases, a directive may include (e.g., encode) an identifier of a second device, such as the kitchen lights, and an operation to be performed at the second device. Directive data that is generated by the skills execution component 644 (and/or the natural language processing system 220) may be formatted using Java, such as JavaScript syntax, or JavaScript-based syntax. This may include formatting the directive using JSON. In some embodiments, a locally-generated directive may be serialized, much like how remotely-generated directives are serialized for transmission in data packets over the network. In other embodiments, a locally-generated directive is formatted as a programmatic API call with a same logical operation as a remotely-generated directive. In other words, a locally-generated directive may mimic remotely-generated directives by using a same, or a similar, format as the remotely-generated directive.

The local natural language processing component 240' may include an automatic speech recognition (ASR) component 250' that is configured to perform ASR processing on the audio data 211 to convert the audio data 211 into text data (sometimes referred to herein as "ASR text data," an "ASR result", or "ASR data"). ASR transcribes audio data 211 into text data representing the words of the user speech contained in the audio data 211. A spoken utterance in the audio data 211 can be input to the local ASR component 250', which then interprets the utterance based on the similarity between the utterance and pre-established language models available to the local natural language processing component 240'. In some embodiments, the local ASR component 250' outputs the most likely text recognized in the audio data 211, or multiple hypotheses in the form of a lattice or an N-best list with individual hypotheses corresponding to confidence scores or other scores (such as probability scores, etc.). In some embodiments, the local ASR component 250' is customized to the user (or multiple users) who created a user account to which the device 111 is registered. For instance, the language models (and other data) used by the local ASR component 250' may be based on known information (e.g., preferences) of the user, and/or on a history of previous interactions with the user.

The local natural language processing component 240' may also include a local NLU component 260' that performs NLU processing on the generated ASR text data to determine intent data and/or slot data (referred to herein as a "NLU result", or "NLU data") so that directives may be determined (e.g., by the skills execution component 644) based on the intent data and/or the slot data. Generally, the local NLU component 260' takes textual input (such as text data generated by the local ASR component 250') and attempts to make a semantic interpretation of the ASR text data.

Natural Language Processing System

In other situations, the device 111 may send the audio data 211 to the natural language processing system 220 for processing. As described above, the device 111 may capture audio using the microphone 470, and send audio data 211 (e.g., representing a spoken user request), corresponding to the captured audio, to the natural language processing system 220. The device 111 may include a wakeword detection component that detects when input audio includes a spoken wakeword, and when the wakeword is detected, the audio data 211 is sent by the device 111 to the natural language processing system 220. In the example of FIG. 6, the natural language processing system 220 is an example of a non-LLM-based processing flow 12. However, in other examples, the backend natural language processing system 220 may be implemented as an LLM-based processing flow.

Upon receipt by the natural language processing system 220, the audio data 211 may be sent to an orchestrator component 230. The orchestrator component 230 may include memory and logic that enables the orchestrator component 230 to send various pieces and forms of data to various components of the system.

Similar to the operation described above with respect to the local natural language processing component 240' of the device 111, the orchestrator component 230 may send the audio data 211 to a natural language processing component 240. An ASR component 250 of the natural language processing component 240 transcribes the audio data 211 into one or more hypotheses representing speech contained in the audio data 211. The natural language processing component 240 interprets the speech in the audio data based on a similarity between the characteristics of the audio data corresponding to the speech and pre-established language models. For example, the natural language processing component 240 may compare the audio data 211 with models for sounds (e.g., subword units such as phonemes) and sequences of sounds to identify words that match the sequence of sounds in the speech represented in the audio data 211. The natural language processing component 240 may send text data generated thereby to an NLU component 260 of the natural language processing component 240. The text data output by the natural language processing component 240 may include a top scoring hypothesis of the speech represented in the audio data 211 or may include an N-best list including a group of hypotheses of the speech represented in the audio data 211, and potentially respective scores ASR processing confidence scores.

The NLU component 260 attempts to make a semantic interpretation of the phrases or statements represented in the text data input therein. That is, the NLU component 260 determines one or more meanings associated with the phrases or statements represented in the text data based on individual words represented in the text data. The NLU component 260 interprets a text string to derive an intent of the user (e.g., an action that the user desires be performed) as well as pertinent pieces of information in the text data that allow a device (e.g., the natural language processing system 220) to complete the intent. For example, if the text data corresponds to "Play the new album by {Musical_Artist}", the NLU component 260 may determine the user intended to invoke a music playback intent to play the identified album. In various other examples, instead of using a dedicated NLU component 260 and/or skills 290, the natural language processing system may instead use an LLM that may perform functionality similar to the NLU component 260 and/or the various skills 290.

The natural language processing system 220 may include a non-transitory computer-readable memory storage 270, storing various instructions for operation of the natural language processing system 220.

As described above, the natural language processing system 220 may include one or more skills 290. The natural language processing system 220 may also include a TTS component 280 that synthesizes speech (e.g., generates audio data) corresponding to text data input therein. The TTS component 280 may perform speech synthesis using one or more different methods. In one method of synthesis called unit selection, the TTS component 280 matches text data against one or more databases of recorded speech. Matching units are selected and concatenated together to form audio data. In another method of synthesis called parametric synthesis, the TTS component 280 varies parameters such as frequency, volume, and noise to create an artificial speech waveform output. Parametric synthesis uses a computerized voice generator, sometimes called a vocoder.

The various components of the natural language processing system 220 and the device 111 described herein may be implemented in software, hardware, firmware, or some combination thereof.

The natural language processing system 220 may reside on device 111, in a cloud computing environment, or some combination thereof. For example, the device 111 may include computing equipment, some portion of which is configured with some or all of the components or functionality of natural language processing system 220 and another portion of which is configured with some or all of the components or functionality of computing device(s) used in natural language processing system 220. The device 111 may then perform a variety of functions on its own (such as when remote communications are unavailable), and/or may communicate (when capable) with computing device(s) and/or the natural language processing system 220 to perform other functions. Alternatively, all of the functionality may reside on the device 111 or remotely.

FIG. 7 depicts an example process 700 for embedding-free neural speaker diarization, in accordance with various aspects of the present disclosure. The process 700 of FIG. 7 may be executed by one or more computing devices. The actions of process 700 may represent a series of instructions comprising computer-readable machine code executable by a processing unit of a computing device. In various examples, the computer-readable machine code may be comprised of instructions selected from a native instruction set of the computing device and/or an operating system of the computing device. Various actions in process 700 may be described above with reference to elements of FIGS. 1-6. Although shown in a particular order, the steps of process 700 may instead be performed in a different order. Additionally, various steps may be performed in parallel in various implementations. Further, some steps may be omitted and/or other steps may be added in accordance with the network anomaly detection techniques described herein.

Process 700 may begin at action 702, at which a first number of windows of fixed size (e.g., a fixed number of audio frames) may be determined for first audio. In various examples, the input audio, which may be of any duration, may be split into any number of fixed-size windows. Each window may be of the same duration (e.g., the same amount of time). In the example of action 702, a first window includes a first set of frames and a second window includes a second set of frames.

Processing may continue at action 704, at which a machine learning model (e.g., EEND 206) may determine a first local speaker ID label for a first frame of the first window and a second local speaker ID label for a second frame of the first window. For example, the machine learning model may output postior data that may be thresholded, as described above, to determine different speaker labels for the first frame and the second frame. As such, the first frame and the second frame may be labeled with different local speaker ID labels. The speaker ID labels may be "local" in the sense that the frames are within the same window.

Processing may continue at action 706, at which the machine learning model (e.g., EEND 206) may determine a third local speaker ID label for a third frame of the second window. For example, local EEND may be performed on the second window and a third frame of the second window may be labeled with the third local speaker ID label. However, it may be uncertain as to whether the third local speaker ID label pertains to the same speaker or a different speaker relative to the first and second local speaker ID labels of the first window.

Processing may continue at action 708, at which first combined data representing at least the first frame and the third frame may be generated. For example, since the first frame is associated with a first local speaker ID label in the first window and the third frame is associated with a third local speaker ID label in the third window, these two frames may be combined in a chunk $\hat{X}_i$ for global EEND. In various examples, the chunk may include the frames of the first window labeled with the first local speaker ID label (without overlap frames) and the frames of the second window labeled with the third local speaker ID label (without overlap frames). Similarly, at action 710, second combined data representing at least the second frame and the third frame may be generated. For example, since the second frame is associated with a second local speaker ID label in the first window and the third frame is associated with the third local speaker ID label in the third window, these tow frames may be combined in a different chunk $\hat{X}_j$. This different chunk may include the frames of the first window labeled with the second local speaker ID label (without overlap frames) and the frames of the second window labeled with the third local speaker ID label (without overlap frames). It should be appreciated that any number of chunks $\hat{X}_i$ may be generated to permute the different local speaker ID labeled frames across different windows, as described above in reference to FIG. 2B.

Processing may continue at action 712, at which the machine learning model may generate first posterior data associated with the first frame using the first combined data. The first posterior data may be associated with the chunk that includes the first frame and may be a vector representing the conditional probabilities that the first frame corresponds to each local speaker ID label. Similarly, the machine learning model may generate second posterior data associated with the third frame using the first combined data.

Processing may continue at action 714, at which the machine learning model may generate third posterior data associated with the second frame using the second combined data and fourth posterior data associated with the third frame using the second combined data. The third posterior data may be associated with the chunk that includes the second frame and the third frame and may be a vector representing the conditional probabilities that the second frame corresponds to each local speaker ID label. Similarly, the fourth posterior data may represent the conditional probabilities that the third frame corresponds to each local speaker ID label.

Processing may continue at action 716, at which a determination may be made that the first local speaker ID label and the third local speaker ID label correspond to the same speaker based at least in part on the first posterior data, the second posterior data, the third posterior data, and the fourth posterior data. For example, the first posterior data and the second posterior data may be highly similar (e.g., the vectors representing the first posterior data and the second posterior data may have high cosine similarity), indicating that the first local speaker ID label and the third local speaker ID label likely correspond to the same speaker. Pairwise similarity between posterior data may be determined for the local speaker ID labels in each chunk. Clustering may then be performed (as described above in reference to FIG. 3) to determine clusters of pairwise similarity. In various examples, the same global speaker label may be applied to each cluster (e.g., to the frames associated with the local speaker IDs associated with each cluster).

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A computer-implemented method comprising:

receiving first audio data representing, at least in part, speech from at least a first speaker and a second speaker;

separating the first audio data into W windows, where each window of the W windows is of a same duration to within a tolerance;

generating respective audio feature data representing each frame of the first number of audio frames;

determining, using a neural diarization model and first audio feature data representing a first frame of a first window of the W windows, first local speaker identifier (ID) data labeling the first frame;

determining, using the neural diarization model and second audio feature data representing a second frame of the first window, second local speaker ID data labeling the second frame;

determining, using the neural diarization model and third audio feature data representing a third frame of a second window of the W windows, third local speaker ID data labeling the third frame;

generating first combined audio feature data based at least in part by combining the first audio feature data labeled with the first local speaker ID data and the third audio feature data labeled with the third local speaker ID data;

generating, by the neural diarization model using the first combined audio feature data, first posterior data associated with the first frame of the first window and second posterior data associated with the third frame of the second window;

generating second combined audio feature data based at least in part by combining the second audio feature data labeled with the second local speaker ID and the third audio feature data labeled with the third local speaker ID;

generating, by the neural diarization model using the second combined audio feature data, third posterior data associated with the second frame of the first window and fourth posterior data associated with the third frame of the second window;

determining a first similarity score by comparing the first posterior data to the second posterior data;

determining a second similarity score by comparing the third posterior data to the fourth posterior data; and determining, based at least in part on a comparison of the first similarity score and the second similarity score, that the first local speaker ID data and the third local speaker ID data pertain to the first speaker; and generating first global label data labeling the first frame of the first window and the third frame of the second window as pertaining to the first speaker.

2. The computer-implemented method of claim 1, further comprising:

generating first constraint data effective to prevent audio frames determined by the neural diarization model as being associated with different local speaker ID data within a same window W from being labeled as pertaining to a same speaker across windows W.

3. The computer-implemented method of claim 1, further comprising:

generating an affinity matrix, wherein each element of the affinity matrix represents a pairwise similarity score between posterior data generated for frames from two different windows;

clustering pairwise similarity scores from the affinity matrix to determine a plurality of clusters; and generating respective global speaker label data for each cluster of the plurality of clusters, wherein each cluster is associated with a single speaker.

4. The computer-implemented method of claim 1, wherein the first posterior data represents, at least in part, a conditional probability that the first frame is associated with the first speaker ID data given the first combined audio feature data.

5. An embedding-free method for speaker diarization, comprising:

determining, for first audio, a first window and a second window, wherein the first window comprises a first set of frames and the second window comprises a second set of frames;

determining, using a machine learning model, a first speaker ID label for a first frame of the first set of frames and a second speaker ID label for a second frame of the first set of frames;

determining, using the machine learning model, a third speaker ID label for a third frame of the second set of frames;

generating first combined data representing at least the first frame and the third frame;

generating second combined data representing at least the second frame and the third frame;

generating, by the machine learning model using the first combined data, first posterior data associated with the first frame and second posterior data associated with the third frame;

generating, by the machine learning model using the second combined data, third posterior data associated with the second frame and fourth posterior data associated with the third frame; and determining that the first speaker ID label and the third speaker ID label correspond to the same speaker based at least in part on the first posterior data, the second posterior data, the third posterior data, and the fourth posterior data.

6. The embedding-free method for speaker diarization of claim 5, comprising:

determining a first similarity score between the first posterior data and the second posterior data;

determining a second similarity score between the first posterior data and the second posterior data; and determining that the first speaker ID label and the third speaker ID label correspond to the same speaker based at least in part on the first similarity score indicating greater similarity relative to the second similarity score.

7. The embedding-free method for speaker diarization of claim 5, comprising:

generating first acoustic feature data representing the first frame and second acoustic feature data representing the second frame; and determining, by inputting the first acoustic feature data and the second acoustic feature data into the machine learning model, the first speaker ID label for the first frame and the second speaker ID label for the second frame.

8. The embedding-free method for speaker diarization of claim 5, comprising labeling the first frame and the third frame with first global label data indicating that the first frame and the third frame are associated with the same speaker.

9. The embedding-free method for speaker diarization of claim 5, wherein the first posterior data represents, at least in part, a probability that the first frame is associated with the first speaker ID label given the first combined data.

10. The embedding-free method for speaker diarization of claim 5, comprising:

generating first constraint data effective to prevent audio frames determined by the machine learning model as being associated with different speaker ID labels within a same window from being labeled as pertaining to the same speaker across different windows.

11. The embedding-free method for speaker diarization of claim 5, comprising:

generating an affinity matrix, wherein each element of the affinity matrix represents a pairwise similarity score between posterior data generated for frames from two different windows of the first audio; and clustering pairwise similarity scores from the affinity matrix to determine a plurality of clusters, wherein each cluster is associated with a single speaker.

12. The embedding-free method for speaker diarization of claim 5, wherein the first posterior data comprises an aggregated vector associated with frames of the first window labeled by the machine learning model with the first speaker ID label during local diarization.

13. A system comprising:

at least one processor; and non-transitory computer-readable memory storing instructions that, when executed by the at least one processor, are effective to:

determine, for first audio, a first window and a second window, wherein the first window comprises a first set of frames and the second window comprises a second set of frames;

determine, using a machine learning model, a first speaker ID label for a first frame of the first set of frames and a second speaker ID label for a second frame of the first set of frames;

determine, using the machine learning model, a third speaker ID label for a third frame of the second set of frames;

generate first combined data representing at least the first frame and the third frame;

generate second combined data representing at least the second frame and the third frame;

generate, by the machine learning model using the first combined data, first posterior data associated with the first frame and second posterior data associated with the third frame;

generate, by the machine learning model using the second combined data, third posterior data associated with the second frame and fourth posterior data associated with the third frame; and determine that the first speaker ID label and the third speaker ID label correspond to the same speaker based at least in part on the first posterior data, the second posterior data, the third posterior data, and the fourth posterior data.

14. The system of claim 13, the non-transitory computer-readable memory storing further instructions that, when executed by the at least one processor, are further effective to:

determine a first similarity score between the first posterior data and the second posterior data;

determine a second similarity score between the first posterior data and the second posterior data; and determine that the first speaker ID label and the third speaker ID label correspond to the same speaker based at least in part on the first similarity score indicating greater similarity relative to the second similarity score.

15. The system of claim 13, the non-transitory computer-readable memory storing further instructions that, when executed by the at least one processor, are further effective to:

generate first acoustic feature data representing the first frame and second acoustic feature data representing the second frame; and determine, by inputting the first acoustic feature data and the second acoustic feature data into the machine learning model, the first speaker ID label for the first frame and the second speaker ID label for the second frame.

16. The system of claim 13, the non-transitory computer-readable memory storing further instructions that, when executed by the at least one processor, are further effective to:

label the first frame and the third frame with first global label data indicating that the first frame and the third frame are associated with the same speaker.

17. The system of claim 16, wherein the first posterior data represents, at least in part, a probability that the first frame is associated with the first speaker ID label given the first combined data.

18. The system of claim 13, the non-transitory computer-readable memory storing further instructions that, when executed by the at least one processor, are further effective to:

generate first constraint data effective to prevent audio frames determined by the machine learning model as being associated with different speaker ID labels within a same window from being labeled as pertaining to the same speaker across different windows.

19. The system of claim 13, the non-transitory computer-readable memory storing further instructions that, when executed by the at least one processor, are further effective to:

generate an affinity matrix, wherein each element of the affinity matrix represents a pairwise similarity score between posterior data generated for frames from two different windows of the first audio; and cluster pairwise similarity scores from the affinity matrix to determine a plurality of clusters, wherein each cluster is associated with a single speaker.

20. The system of claim 13, wherein the first posterior data comprises an aggregated vector associated with frames of the first window labeled by the machine learning model with the first speaker ID label during local diarization.

* * * * *